United States Patent Office.

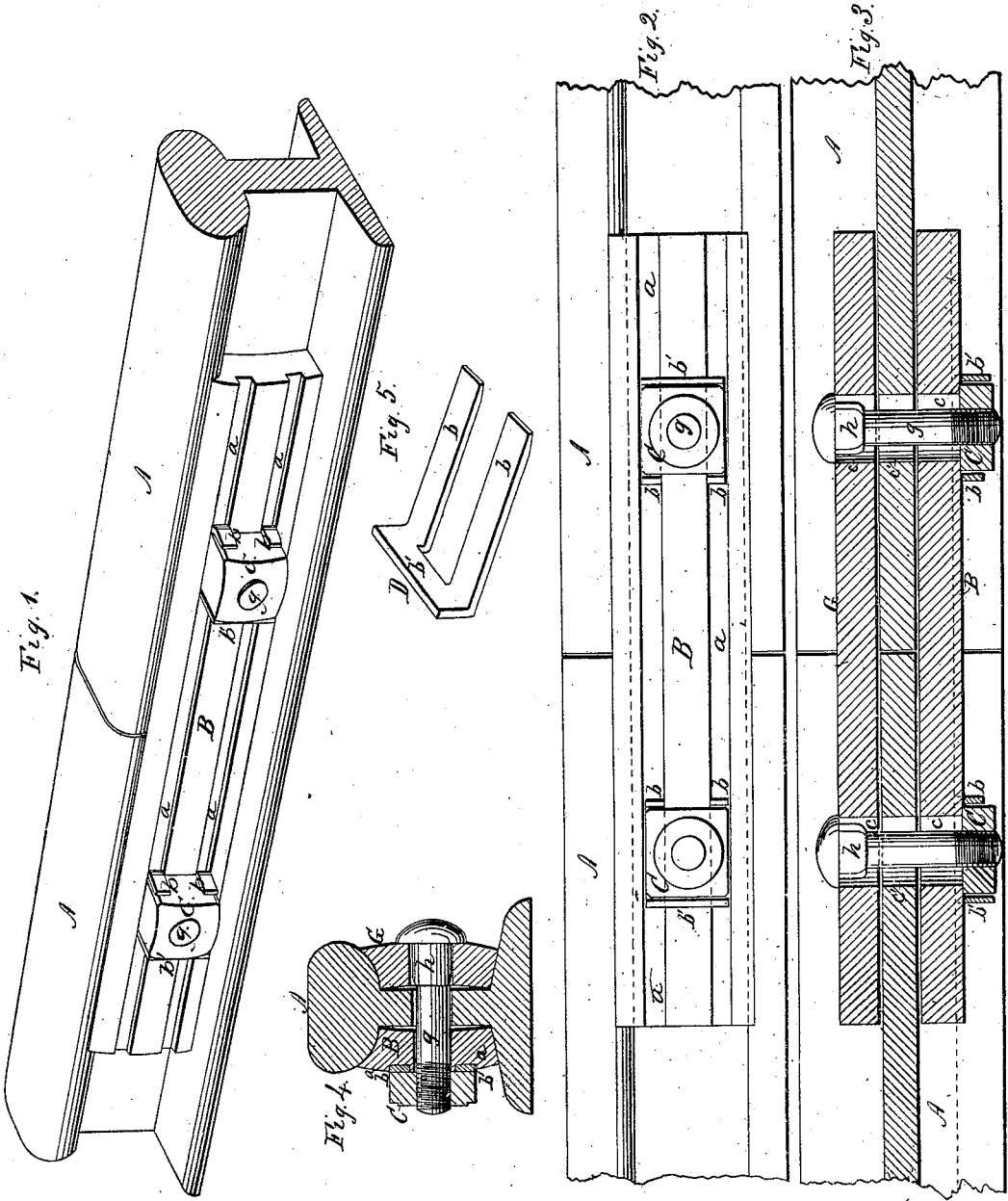

WILLIAM MOREHOUSE, OF BUFFOLA, NEW YORK.

*Letters Patent No. 83,081, dated October 13, 1868.*

IMPROVEMENT IN NUT-LOCKING DEVICE.

The Schedule referred to in these Letters Patent and making part of the same.

*To all whom it may concern:*

Be it known that I, WILLIAM MOREHOUSE, of Buffalo, in the county of Erie, and State of New York, have invented a new and improved Nut-Fastening; and I do hereby declare that the following is a full, clear, and exact description thereof, reference being had to the accompanying drawings, making a part of this specification, in which—

Figure 1 is a perspective view, showing portions of two sections of railroad-rails spliced together, and having my improved nut-fastening.

Figure 2 is a side view of the same parts shown in fig. 1.

Figure 3 is a horizontal section through the parts shown in figs. 1 and 2, taken in the plane indicated by red line $x\ x$ in fig. 2.

Figure 4 is a transverse section, taken in the vertical plane indicated by red line $y\ y$ in fig. 2.

Figure 5 is a perspective view of the fastening before its ends are bent up.

Similar letters of reference indicate corresponding parts in the several figures.

This invention relates to a new and useful device which is designed for preventing nuts or bolts from turning loose after they have been set up tight.

The invention is an improvement on the well-known flexible metal washers for locking nuts and bolts, which are interposed between the nuts or bolt-heads and the object through which the bolts pass, so as to be held immovably in place, and which have their ends or edges turned up against the nuts or bolt-heads after the nuts are screwed home.

The nature of my invention and improvement consists in so constructing a flexible metal locking-device for nuts and bolt-heads that, while it can be readily inserted into its place between a nut or bolt-head and the object through which the bolt passes, after the nut or bolt has been screwed up tight, its ends can be turned up, or so bent as to prevent the nut or bolt-head from turning loose without liability of starting the nut or bolt in so doing, as will be hereinafter explained.

To enable others skilled in the art to understand my invention, I will describe its construction and operation.

In the accompanying drawings, I have represented my improved locking-device applied to the nuts of bolts which are used for securing together the ends of railroad-rails; but, I shall not confine myself to this application of the device, as it will be found useful wherever it may be desired to prevent a bolt, or nut upon a bolt, from working loose.

A A represent the ends of two sections of railroad-rails, which are secured together and supported by means of two opening-pieces or fishing-bars, B G, placed, in the usual well-known manner, against the sides of the rail-sections, under the lips thereof, and confined in place, so as to break joints with the rail-joint, by means of bolts $g\ g$, passed transversely through them, as shown in figs. 3 and 4.

The bolts $g\ g$ pass through longitudinally-oblong slots, $c\ c'$, which are made through the bars B G, and the racks of the rail-sections, as shown in figs. 3 and 4, for the purpose of providing for play caused by expansion and contraction of the rails.

The fishing-bar G is constructed with a plain face, so that the bolt-head will abut closely against it; and that portion, $h$, of each bolt $g$, which passes through this bar G, is flattened on two sides, for the purpose of preventing the bolt from turning.

By thus constructing each bolt, it will not be necessary to seat the head of the bolt into the bar G, as has been done heretofore in conjunction with nut-fastenings.

The bar B, which is secured upon the opposite side of the rails to the bar G, and against which the nuts C C are screwed, is constructed with grooves, $a\ a$, in its face, extending throughout its length, which grooves may be made of any desirable width and depth. The object of these grooves is to receive the narrow parallel strips, $b\ b$, of the locking-devices when the nuts are screwed up tight against the surface of the bar B, and serve as means for preventing the locking-devices from turning when inserted into said grooves behind the nuts.

Instead of the longitudinal grooves $a\ a$, a central elevation may be made upon the surface of the bar B, so as to serve as an abutment against which to screw the nuts, and also as shoulders for keeping the locking-devices rigidly fixed against being turned with the nuts.

The narrow strips, $b\ b$, of each locking-device D, are connected together by a transverse strip, $b'$, which is turned at right angles to the plane of these strips $b$, so that, when the device is inserted in its place between its nuts and the bar B, the strips $b'$ will abut against one edge of the nut, as shown in figs. 1, 2, and 3, and assist to prevent the nut from turning.

The forked ends, $b\ b$, of each locking-device, are somewhat longer than the width of a nut, so that these ends can be turned up against the edge of a nut, as shown in figs. 1, 2, and 3, and thus serve, in conjunction with the connecting-strip $b'$ and the shoulder-abutments, which are formed in the bar B by making the grooves $a\ a$, as a means for securely locking and holding a nut in place upon its bolt.

The locking-devices may be made of flexible metal, properly stamped out of sheet-metal, and bent, as shown and described; but I prefer to make these devices of malleable iron, as they can then be cast of the exact shape required for use.

The nuts are screwed tightly upon their bolts before the locking-devices are inserted in their places, and, as the grooves $a\ a$ are of sufficient depth to receive the strips *b b* of each locking-device back of the nut when screwed up tightly against the face of the bar B, it will be seen that it is a very simple operation to insert the locking-devices in place, and strike up the ends of the narrow strips, as shown in the drawings.

Hitherto perforated washer-plates have been used for locking-nuts, which washers require to be slipped upon the bolts before the nuts are screwed upon them. The act of screwing the nuts home seats the washers in their places, after which the edge or edges of the washers are turned up by means of chisels.

One objection to the washers is, that the blows required to upset or turn up their wide projecting edges, to effect the locking of the nuts, will frequently loosen the nuts or start the bolts and nuts from their places. This objection is found to exist particularly where the bolts pass through oblong holes or slots, as represented in fig. 3.

With the forked or staple-shaped locking-device, a nut is first screwed hard up, and then, when the forked portions, *b b*, are inserted behind it, and the square portion, *b'*, brought snugly to its place against the edge of the nut, the narrow ends of said forked portions can be readily turned up, bent, or twisted, without any liability of starting either the bolt or nut.

The forked locking-device is equally applicable to the locking of bolt-heads which are made square, and is applied to such heads precisely as described for the nuts.

While I prefer to construct the bars B with grooves extending their entire length, because they are readily rolled in this way, I do not confine myself to having the grooves extend the entire length of these bars.

Having described my invention,

What I claim as new, and desire to secure by Letters Patent, is—

The forked nut-locking device D, constructed with a shoulder, *b'*, and with separated portions, *b b*, substantially as and for the purpose described.

Witness my hand, in the matter of my application for a patent for an improved locking-device for nuts and bolts.

WM. MOREHOUSE.

Witnesses:
R. T. CAMPBELL,
J. P. CAMPBELL.